(12) United States Patent
Marquette

(10) Patent No.: US 10,384,852 B2
(45) Date of Patent: Aug. 20, 2019

(54) SYSTEM FOR STORING A RAZOR TO PROLONG ITS SHELF LIFE

(71) Applicant: Richard Marquette, Victoria, TX (US)

(72) Inventor: Richard Marquette, Victoria, TX (US)

(*) Notice: Subject to any disclaimer, the term of this patent is extended or adjusted under 35 U.S.C. 154(b) by 12 days.

(21) Appl. No.: 15/898,928

(22) Filed: Feb. 19, 2018

(65) Prior Publication Data

US 2018/0170651 A1  Jun. 21, 2018

Related U.S. Application Data

(63) Continuation-in-part of application No. 15/272,434, filed on Sep. 22, 2016, now abandoned.

(51) Int. Cl.

| | |
|---|---|
| *B65D 81/26* | (2006.01) |
| *B26B 21/40* | (2006.01) |
| *A45D 27/22* | (2006.01) |
| *B65D 25/14* | (2006.01) |
| *B65D 43/16* | (2006.01) |
| *B32B 33/00* | (2006.01) |
| *B65D 25/16* | (2006.01) |

(52) U.S. Cl.
CPC ........... *B65D 81/264* (2013.01); *A45D 27/22* (2013.01); *A45D 27/225* (2013.01); *B26B 21/40* (2013.01); *B32B 33/00* (2013.01); *B65D 25/14* (2013.01); *B65D 25/16* (2013.01); *B65D 43/16* (2013.01); *B65D 2543/00074* (2013.01)

(58) Field of Classification Search
CPC ...... A45D 27/22; A45D 27/225; A45D 27/48; B26B 21/40; B65D 25/14; B65D 25/16; B65D 43/16; B65D 81/26; B65D 2543/00074; B65D 81/264

USPC .......... 206/204–209, 349–352, 523
See application file for complete search history.

(56) References Cited

U.S. PATENT DOCUMENTS

| | | | | |
|---|---|---|---|---|
| 1,835,408 | A * | 12/1931 | Kurtz, Jr. ............... | A45D 27/48 206/204 |
| 2,282,908 | A * | 5/1942 | Thompson ......... | B65D 81/1075 206/523 |
| 2,551,859 | A * | 5/1951 | Thompson ............. | A45D 27/46 206/208 |
| 2,925,905 | A * | 2/1960 | Metzler .................. | A45D 27/22 206/352 |
| 5,356,006 | A * | 10/1994 | Alpern ................... | B65D 5/302 206/523 |
| 8,342,322 | B2 * | 1/2013 | De'Rennaux ......... | A45D 27/22 206/204 |
| 2015/0059197 | A1 * | 3/2015 | Sassano ................. | A45D 27/48 34/80 |
| 2018/0160790 | A1 * | 6/2018 | Swatty ................... | A45D 27/22 |

* cited by examiner

*Primary Examiner* — Bryon P Gehman
(74) *Attorney, Agent, or Firm* — Spradley PLLC; Michael Spradley

(57) ABSTRACT

A razor enclosure is disclosed herein. The razor can comprise a case, and a bottom rigid support. The case can have a base and a lid and is capable of housing a razor in a chamber formed by the lid and base. The bottom rigid support can be mounted the base. Further, the bottom rigid support can have one or more slits at the top front surface of the bottom rigid support, a tray having a rim and a recess, a permeable inner layer mounted over the one or more slits, and one or more absorbent inner cores. The rim can attach to the top back surface of the bottom rigid support such that the recess is behind the one or more slits.

8 Claims, 17 Drawing Sheets

US 10,384,852 B2

SYSTEM FOR STORING A RAZOR TO PROLONG ITS SHELF LIFE

BACKGROUND

This disclosure relates to a system for storing a razor to prolong its shelf life.

Today, one of the most common ways of storing a razor is by placing it in a closed drawer, or by laying it exposed in an open shelf. Such method can be effective in safely keeping the razor out of reach from small children, but it does not prevent the razor from exposure to moisture and other air contaminants. Another method used in storing the razor is placing it within a container. This method can be effective in minimizing exposure to outside environment but does little or no help in prolonging the shelf life of the blade in a razor. Extending the shelf life of a razor blade is of great use to a consumer, as razor blades can be quite expensive. In 2016, blade cartridges often sale for between one to five dollars a piece. As such it would be useful to have an improved system for storing a razor to prolong its shelf life.

SUMMARY

A razor enclosure is disclosed herein. The razor can comprise a case, and a bottom rigid support. The case can have a base and a lid and is capable of housing a razor in a chamber formed by the lid and base. The bottom rigid support can be mounted the base. Further, the bottom rigid support can have one or more slits at the top front surface of the bottom rigid support, a tray having a rim and a recess, a permeable inner layer mounted over the one or more slits, and one or more absorbent inner cores. The rim can attach to the top back surface of the bottom rigid support such that the recess is behind the one or more slits.

DETAILED DESCRIPTION

Described herein is a system for storing a razor to prolong its shelf life. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
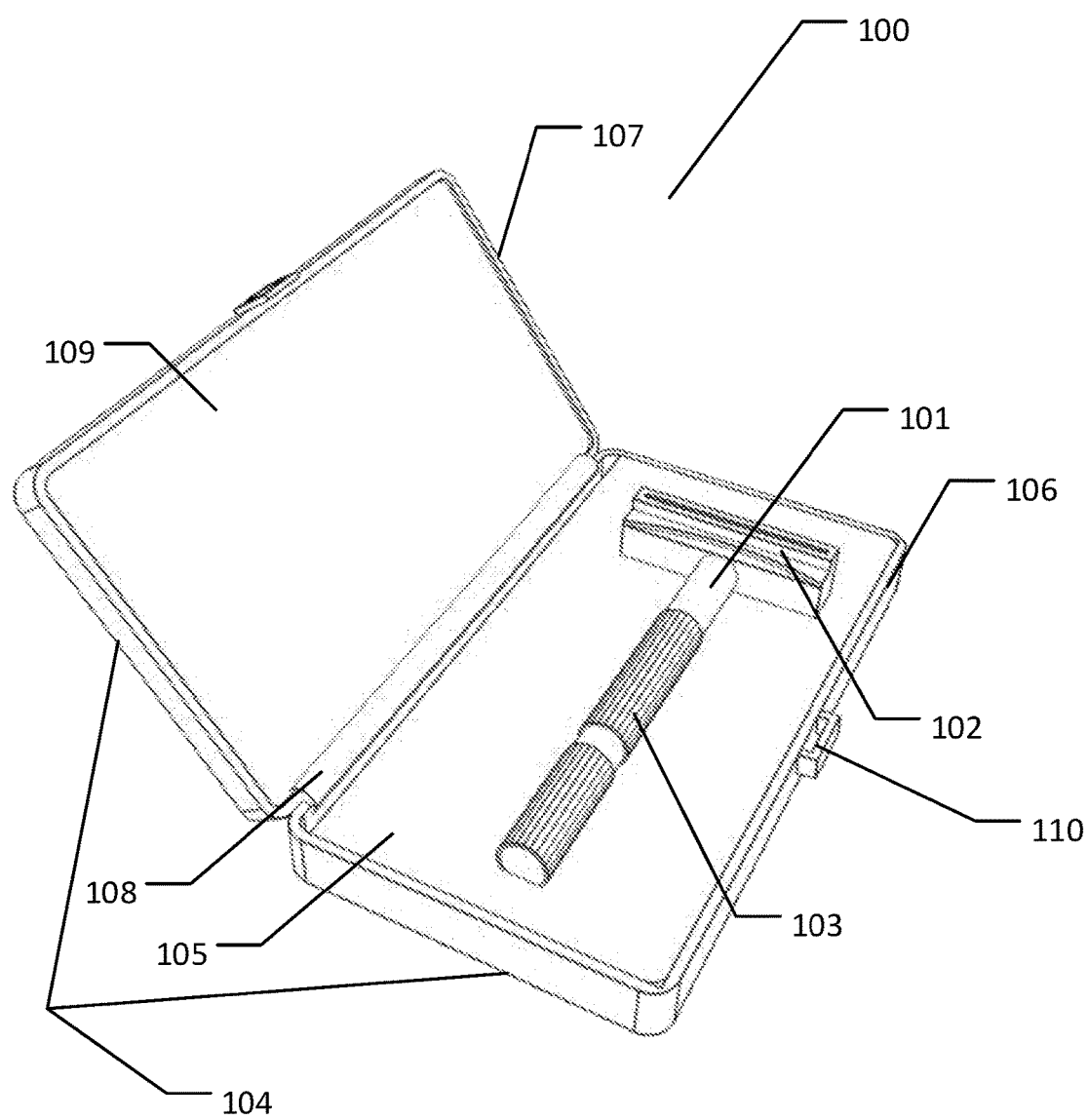
FIG. 1 illustrates a razor enclosure with a razor inside.

FIG. 1 illustrates a razor enclosure 100 with a razor 101 inside. An example of razor 101 is a standard disposable razor that is primarily used to remove unwanted body hair by shaving. Other examples of razor 101 may include razors that employ disposable cartridges, and straight razors. The main parts of razor 101 can comprise a head 102 and a handle 103. In one embodiment, head 102 can be a disposable cartridge. Head 102 can be the portion of razor 101 that mounts the razor blade. Handle 103 can be the elongated portion of razor 101 that can be used to grip onto razor 101.

Razor enclosure 100 can comprise a casing 104, and a lining 105. Casing 104 can be used to store and protect razor 101. Casing 104 can be made of a disposable material such as plastics, paperboard, and/or corrugated fiberboard. Casing 104 can comprise a base 106, and a lid 107, attached together by a hinge 108. In one embodiment, base 106, lid 107, and/or hinge 108 can be unibody. In another embodiment, base 106, lid 107, and hinge 108 can be separate components. Hinge 108 can allow lid 107 to swing open providing access to chamber 109. Further in one embodiment, the side of lid 107 opposite to hinge 108 can comprise a lock mechanism 110 that can allow casing 104 to be closed securely. In one embodiment, lining 105 can fit snugly within base 106. Base 106 and lid 107 together can form a chamber 109. Base 106 can comprise a hollow portion capable of mounting lining 105. Lid 107 can be used to close razor enclosure 100 and prevent chamber 109 from exposure to outer surroundings. Lining 105 can be a sheet of material mounted within the inner surface of casing 104.

Figure 2:
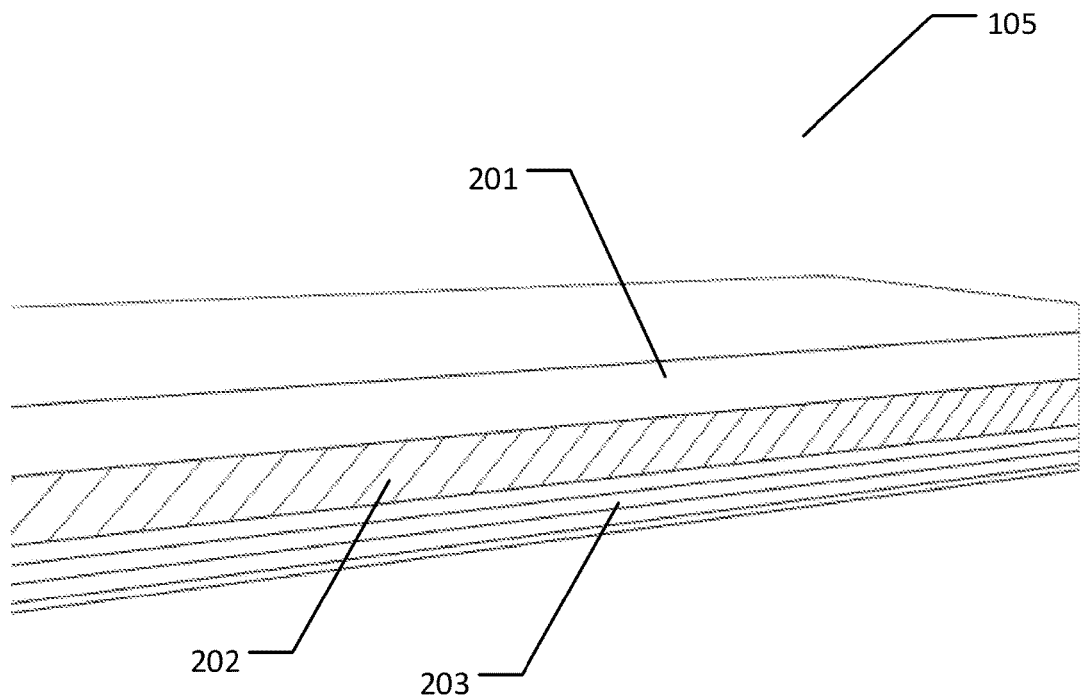
FIG. 2 illustrates a lining comprising a plurality of layers.

FIG. 2 illustrates lining 105 comprising a plurality of layers, including an inner layer 201, an absorbent inner core 202, and a waterproof outer layer 203. Inner layer 201 can be the top-most layer of lining 105. Inner layer 201 can be the portion of lining 105 that comes in contact with razor 101. Inner layer 201 can comprise material such as polypropylene. Inner layer 201 can be permeable, thus allowing liquid to pass through this layer. Absorbent inner core 202 can be the inner layer of lining 105. Absorbent inner core 202 can be the absorbent layer of lining 105 and can comprise material that includes but is not limited to super absorbent polymer (SAP) hydrogel, sodium polyacrylate, polyacrylate absorbents, and/or wood pulp fluff. Liquid that passes through inner layer 201 can be absorbed in absorbent inner core 202. Outer layer 203 can be the out-most layer of lining 105 that rests on one side of absorbent inner core 202. Outer layer 203 can be the waterproof portion of lining 105. The materials used for outer layer 203 can include but is not limited to polyethylene, or plastics such as petroleum-based plastic, plastic-treated material, plant-based plastic (or bioplastic). Outer layer 203 can be the layer that is impermeable to liquid. Outer layer 203 can prevent liquid from leaking out of lining 105. Further in some embodiments, lining 105 can comprise more layers 200 than described in this disclosure. The absorbent characteristics of lining 105 can prevent moisture, and liquid from the outer environment from contaminating the blade on razor 101. Thus, prolonging the shelf life of razor 101.

Further in one embodiment, lining 105 can be mounted within the inner surface of base 106. In such embodiment, razor 101 can be stored at a fixed position within casing 104. In such fixed position, head 102 can be stored within casing 104 with the blade of razor 101 facing towards lining 105. In another embodiment, lining 105 can be attached within the inner surface of base 106 and lid 107. In such embodiment, the inner surface of the entire casing 104 can be covered with lining 105. This is to ensure that razor 101 is completely enclosed within lining 105, when casing 104 is in a closed position. This structure can also allow razor 101 be placed anywhere within casing 104.

Figure 3:
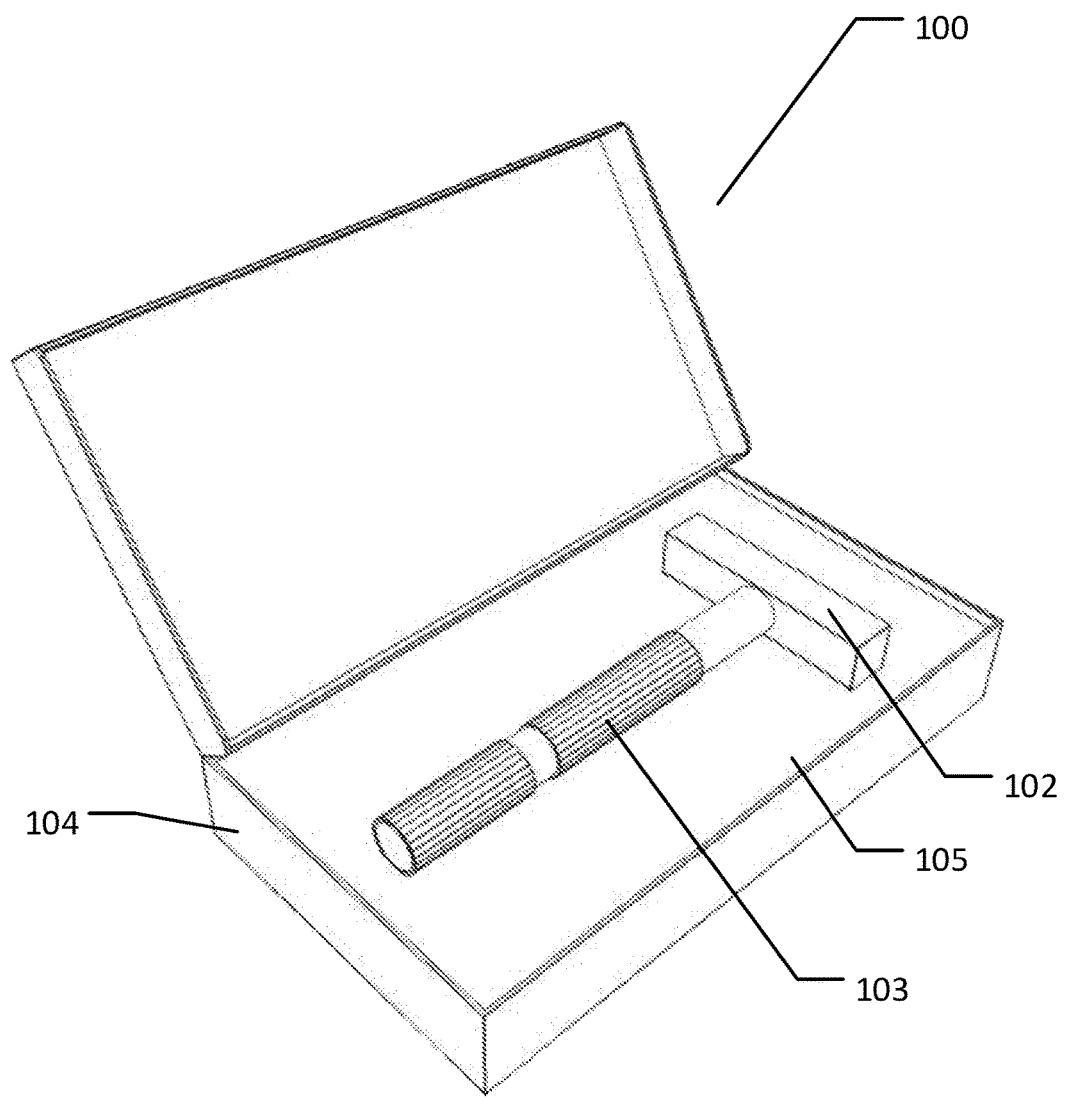
FIG. 3 illustrates one embodiment of a razor enclosure.

FIG. 3 illustrates one embodiment of razor enclosure 100. In one embodiment, head 102 and handle 103 can be stored within razor enclosure 100. Further, in one embodiment, lining 105 can attach permanently within the inner surface of casing 104 through methods that include but are not limited to gluing and tape.

Figure 4:
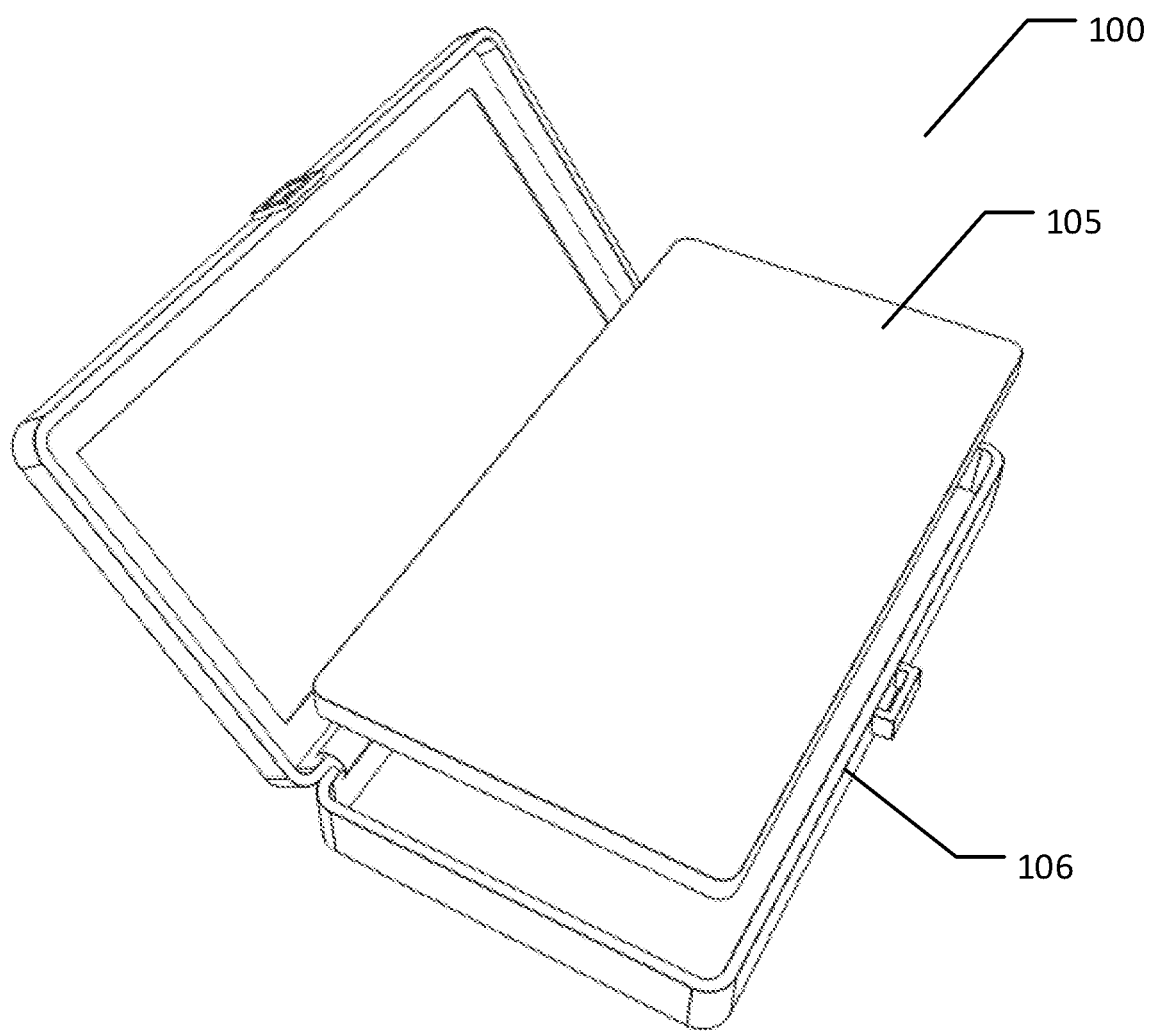
FIG. 4 illustrates another embodiment of a razor enclosure comprising a removable lining.

FIG. 4 illustrates another embodiment of razor enclosure 100 comprising a removable lining 105. Razor enclosure 100 can allow lining 105 be easily removed from base 106 and be replaced with a new lining 105. Lining 105 can be replaced after being soiled, and/or used for a period of time.

Figure 5:
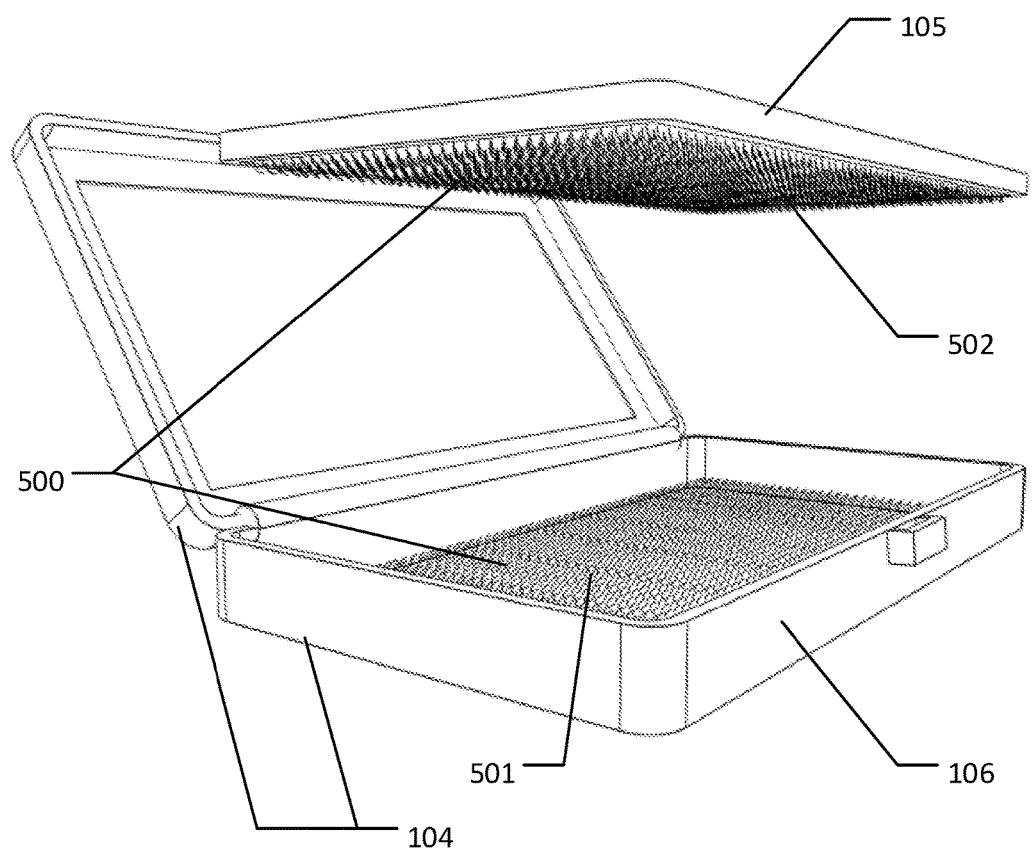
FIG. 5 illustrates a removable lining comprising a fastener.

FIG. 5 illustrates removable lining 105 comprising a fastener 500. Fastener 500 can be any quick-release fastening device that can include but is not limited to hook-and-loop fasteners, or snaps. Fastener 500 can comprise a first fastener 501, and a second fastener 502. First fastener 501 can be mateable with second fastener 502. In this embodiment, inner surface of base 106 can comprise first fastener 501 while the bottom surface of lining 105 can comprise second fastener 502. As an example embodiment, first fastener 501 can be a hook from a hook-and-loop fastener. Second fastener 502 can be a loop from a hook-and-loop fastener. In this embodiment, placing the bottom surface of lining 105 into the inner surface of base 106 can fasten lining 105 with casing 104.

Figure 6A:
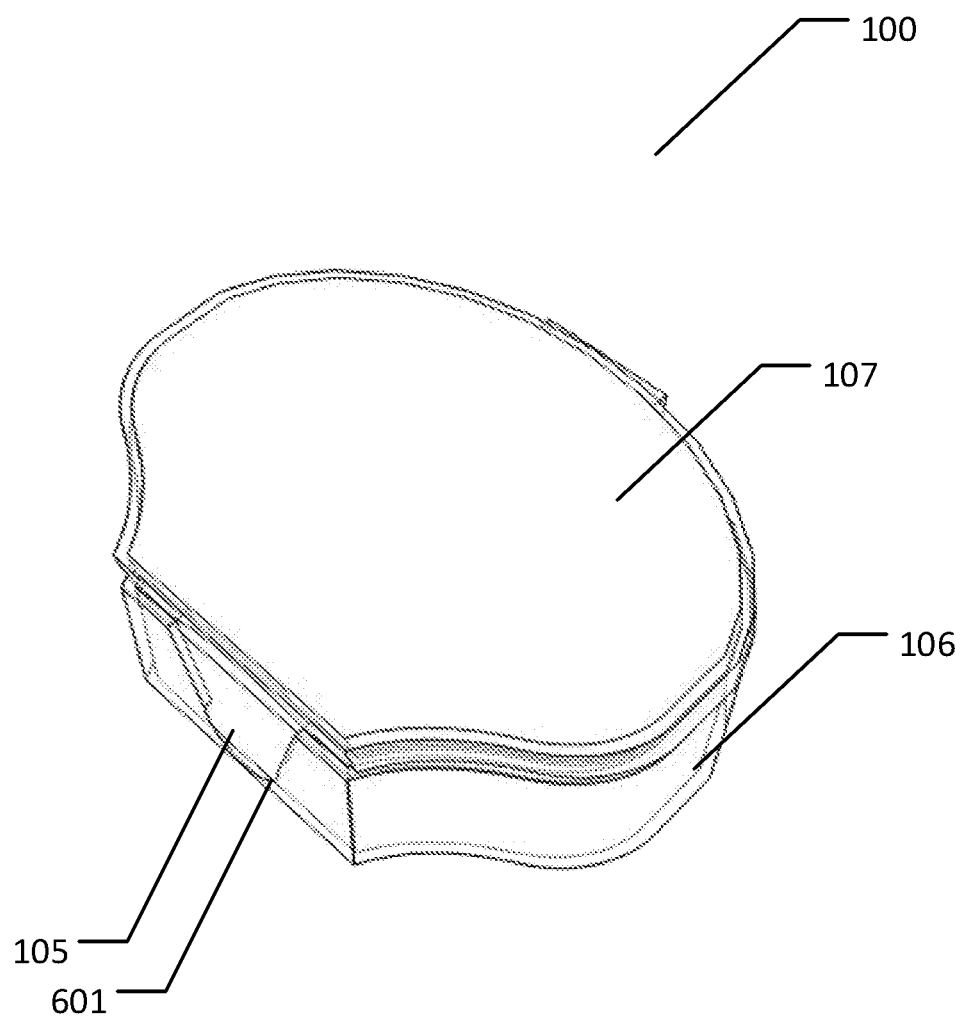
FIG. 6A illustrates an embodiment of a razor enclosure used for covering a head.

FIG. 6A illustrates an embodiment of razor enclosure 100 used for covering head 102. In another embodiment, razor enclosure 100 can be used to enclose a portion of razor enclosure 100, particularly head 102. In such embodiment, razor enclosure 100 can be used to protect the blade mounted on head 102. Casing 104 can be designed in a shape that is capable of enclosing head 102, while leaving handle 103 exposed. Casing 104 can be in various shape and/or sizes, such as rectangular, cylindrical, elliptical, and T-shape. As such, lining 105 can also be contoured according to the shape of casing 104. In this embodiment, casing 104 can comprise base 106, lid 107, and a hole 601. Hole 601 can be an orifice at one side of casing 104 that is capable of fitting handle 103. In one embodiment, lining 105 can be mounted within base 106.

Figure 6B:
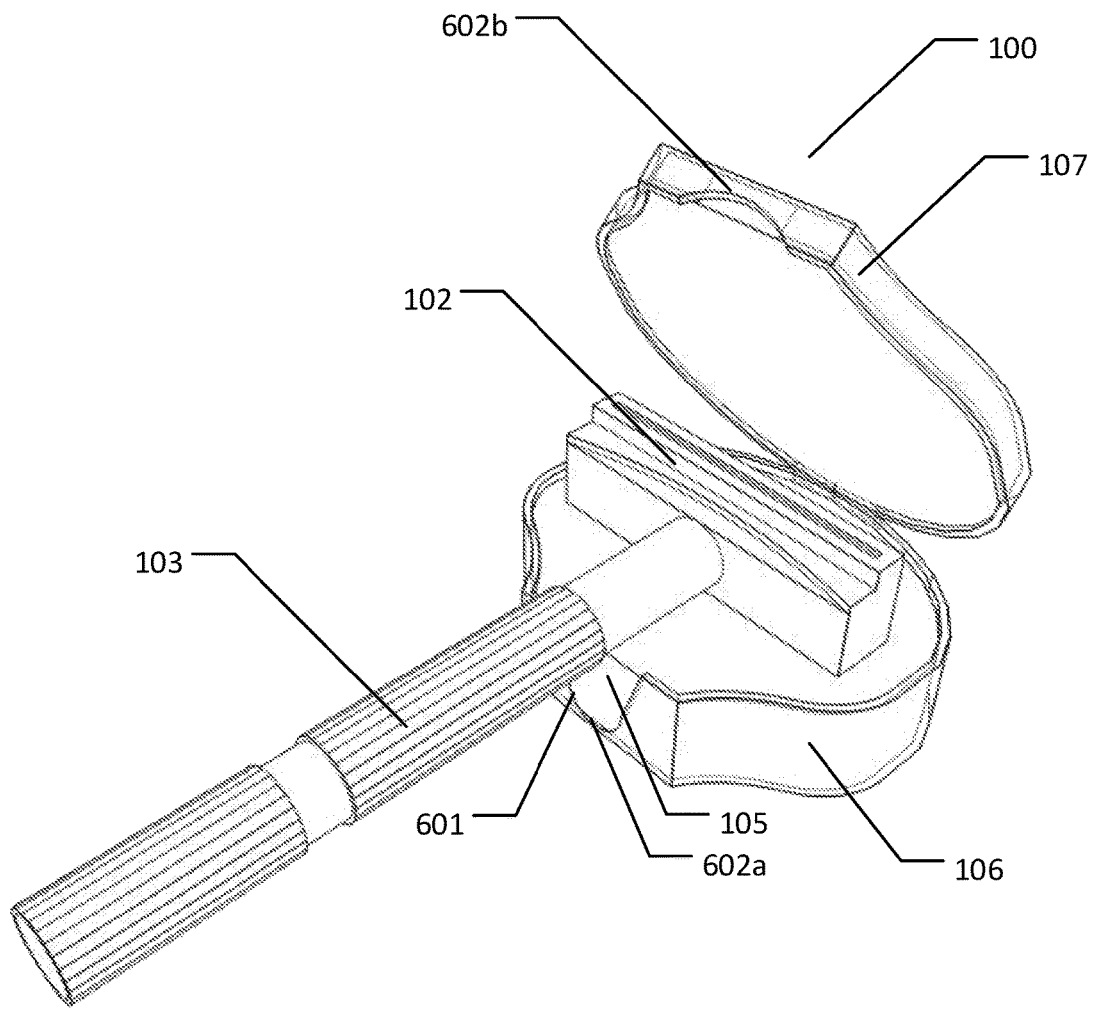
FIG. 6B illustrates an embodiment of a razor enclosure mounted with a razor.

FIG. 6B illustrates an embodiment of razor enclosure 100 mounted with razor 101. In one embodiment, a pair of curved slots 602 can form hole 601. In such embodiment, a first curved slot 602a can be placed at one side of base 106, while a second curved slot 602b can be at the side of lid 107 that is directly on top of first curved slot 602a. In this structure, closing casing 104 can align curved slots 602 on top of each other that forms hole 601. Razor 101 can be placed within razor enclosure 100 by mounting head 102 at the top of lining 105. In one embodiment, head 102 can fit snugly within razor enclosure 100. In such embodiment, casing 104 can be in T-shape form. In another embodiment, there can be an allowance around head 102 when razor 101 is placed within casing 104. In such embodiment, lining 105 can attach within the inner surface of base 106 and lid 107.

Figure 6C:
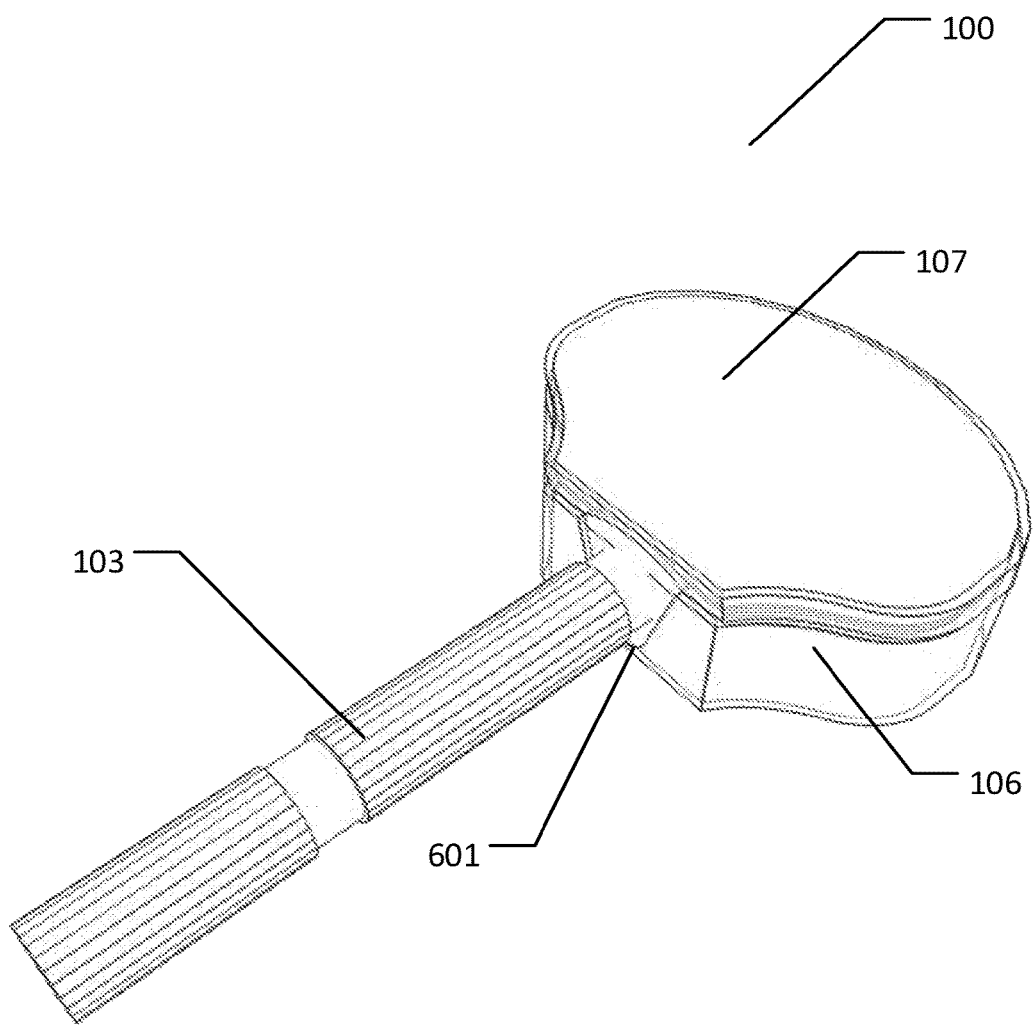
FIG. 6C illustrates an embodiment of a razor enclosure at a closed position.

FIG. 6C illustrates an embodiment of razor enclosure 100 at a closed position. Once casing 104 is closed, handle 103 can stick out from hole 601 of casing 104.

Figure 7A:
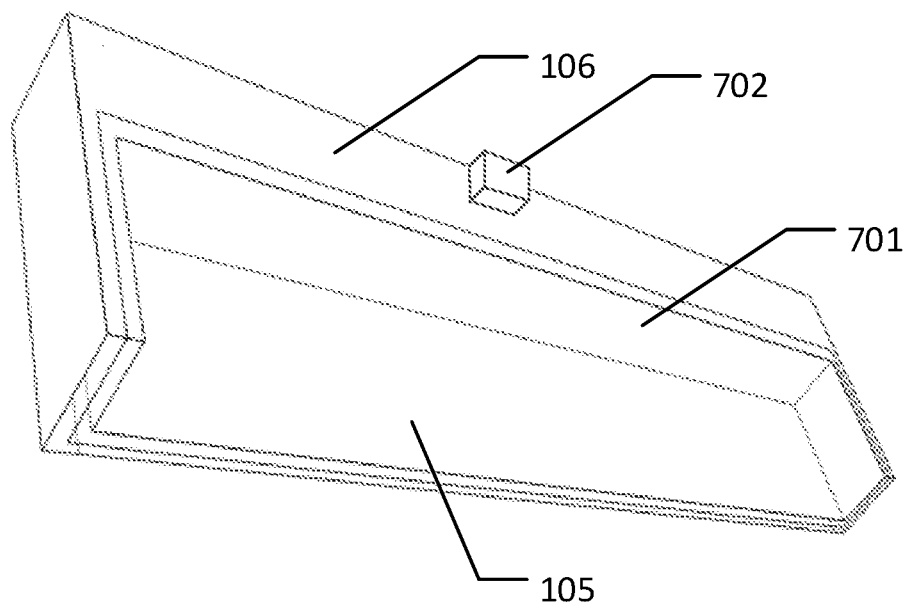
FIG. 7A illustrates an embodiment of a razor enclosure used for covering the blade of a razor.

FIG. 7A illustrates an embodiment of razor enclosure 100 used for covering the blade of razor 101. In this embodiment, razor enclosure 100 can comprise base 106, opening 701, and one or more tabs 702. Opening 701 can be a rectangular hole at one side of base 106 that is mateable with head 102. Tabs 702 can be protruding portions at the outer surface of base 106, which can serve as a grip to allow razor enclosure 100 be easily removed from razor 101. In one embodiment, the inner surface of casing 104 can be covered with lining 105. As such, lining 105 can lid the entire blade portion of head 102. Razor enclosure 100 can clip into head 102 substantially covering the entire blade portion of razor 101.

Figure 7B:
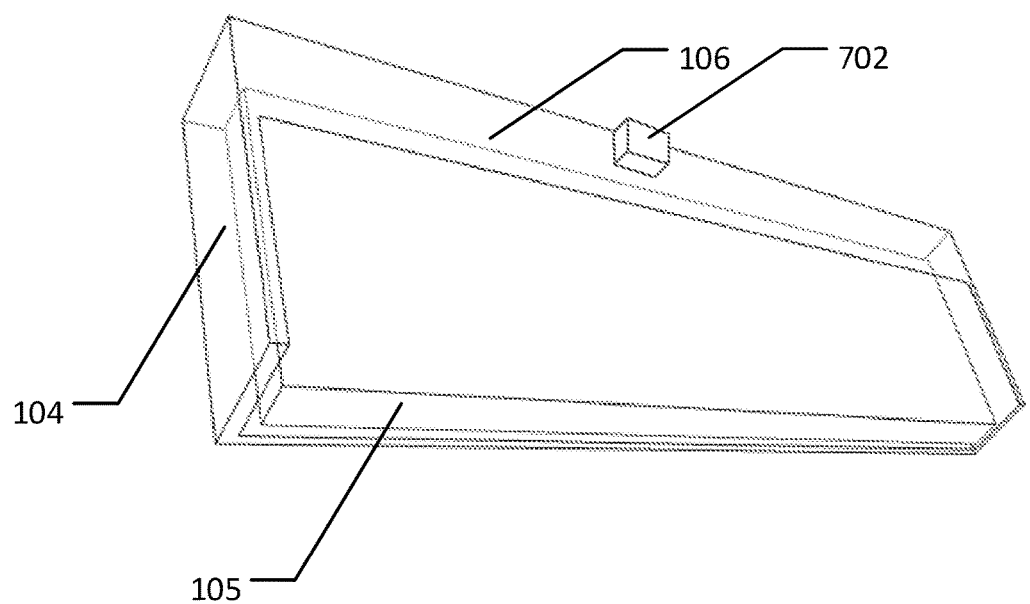
FIG. 7B illustrates another embodiment of a razor enclosure for covering the blade of a razor.

FIG. 7B illustrates another embodiment of razor enclosure 100 for covering the blade of razor 101. In this embodiment, lining 105 can attach on one of the few inner surface of casing 104. As such, the exterior surface of outer layer 203 can comprise an adhesive capable of permanently attaching lining 105 to one of the internal surface of base 106. Lining 105 can be attached at the inner wall surface of base 106 that comes in contact with the blade of razor 101, when razor enclosure 100 is clipped onto head 102.

Figure 7C:
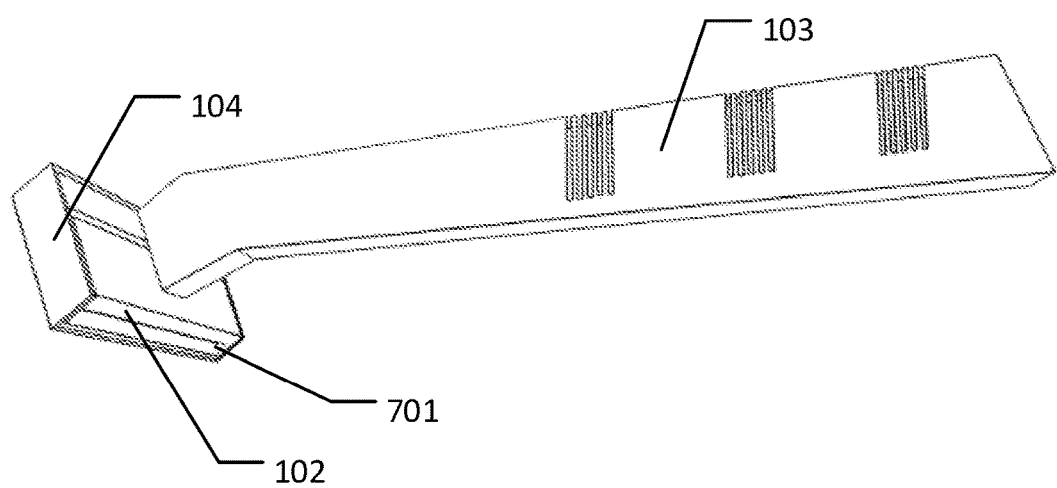
FIG. 7C illustrates a razor enclosure covering the blade of a razor.

FIG. 7C illustrates razor enclosure 100 covering the blade of razor 101. When in use, the back of head 102 can serve as a lid for opening 701.

Figure 8:
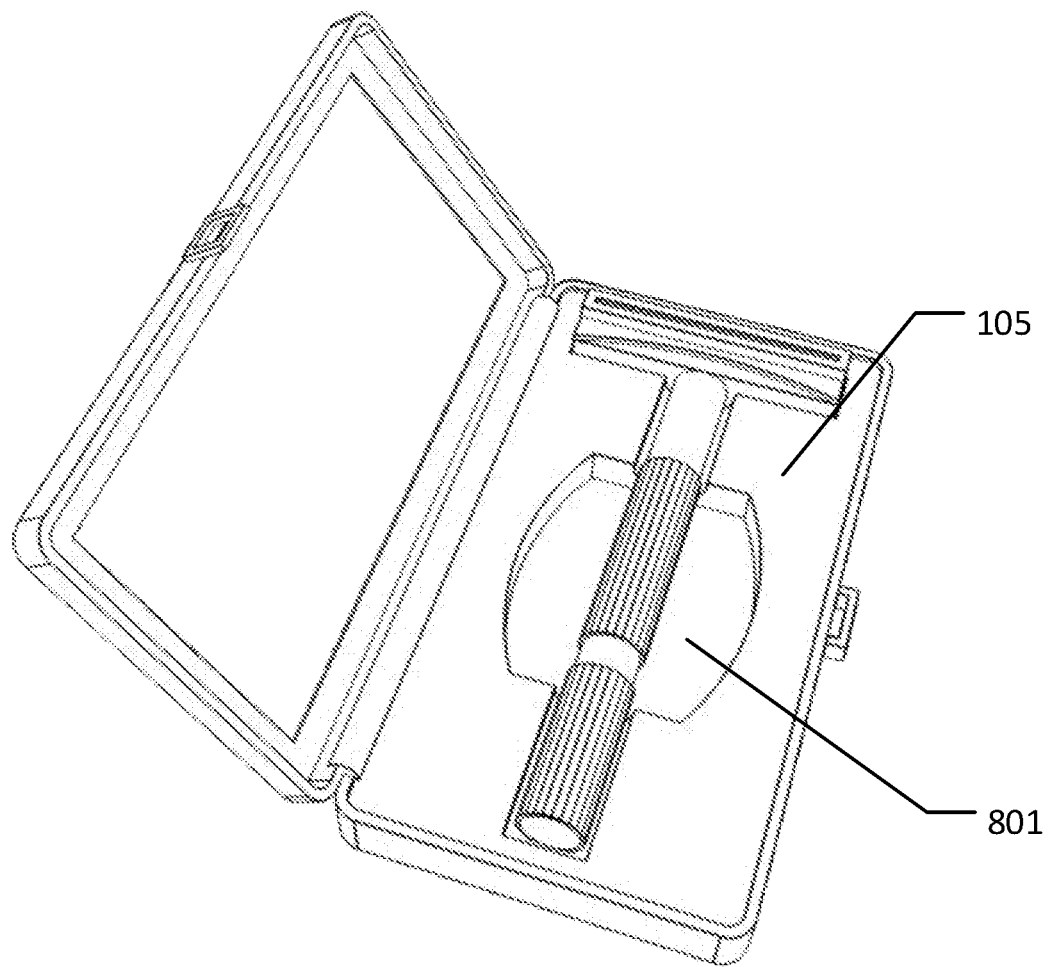
FIG. 8 illustrates an embodiment of a lining comprising a depressed portion.

FIG. 8 illustrates an embodiment of lining 105 comprising depressed portion 801. Depressed portion 701 can be a hollowed portion of lining 105, which can allow razor 101 be mounted snugly within lining 105. Additional cutouts can be cut out to allow for easy placement and removal of razor from razor enclosure 100.

Figure 9:
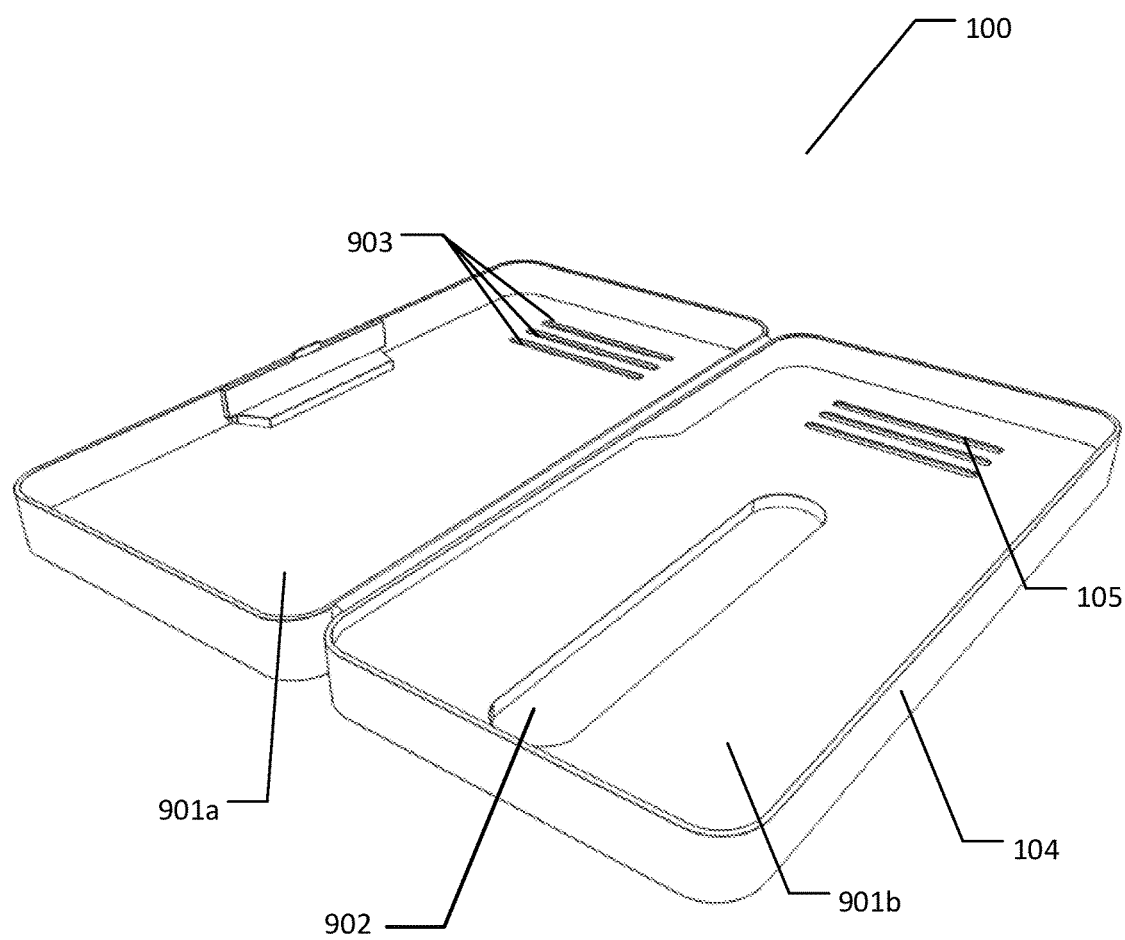
FIG. 9 illustrates an embodiment of a razor enclosure comprising a pair of rigid supports, and a lining.

FIG. 9 illustrates an embodiment of razor enclosure 100 comprising a pair of rigid supports 901a and 901b. Rigid supports 901a and 901b can ensure razor 101 is kept in a fixed position within razor enclosure 100. Rigid supports 901a and 901b can be made of a durable moldable sheet material such as plastic. Rigid supports 901a and 901b can comprise a top rigid support 901a, and a bottom rigid support 901b. Top rigid support 901a can be mounted within the inner surface of lid 107, while bottom rigid support 901b can be mounted within the inner surface of base 106. In one embodiment, rigid supports 901 and casing 104 can be attached together through method that can include but is not limited to adhesives, sewing, hook and loop fastening, or snapping in place. In another embodiment, casing 104 and rigid supports 901 can be unibody. In a preferred embodiment, rigid supports 901 can be removable from casing 104. In this embodiment, each rigid support 901 can be replaceable with new rigid supports 901a and 901b. In one embodiment, top rigid support 901a can fit snugly within lid 107 while bottom rigid support 901b can fit snugly within base 106. Such snug fit structure can allow rigid supports 901a and 901b be kept in place within casing 104 and at the same time can allow each rigid support 901a or 901b to be easily removed from casing 104.

Top rigid support 901a can cover all or a portion of razor 101 while bottom rigid support 901b can cover all or a portion of razor 101. Furthermore, each rigid support 901a can comprise a plurality of slits 903 and lining 105. Slits 903 can be openings at the surface of each rigid support 901. Slits 903 can be placed at the top front surface of each rigid support 901. In such structure when razor 101 is stored within casing 104, slits 903 at top rigid support 901a can cover the front portion of head 102 while slits 903 at bottom rigid support 901b can cover the back portion of head 102. In a preferred embodiment, bottom rigid support 901b can comprise an indentation 902. In such embodiment, handle 103 can be placed within indentation 902 keeping razor 101 at a fixed position wherein head 102 can be kept within the surface of slits 903 of top rigid support 901a and bottom rigid support 901b.

Figure 10A:
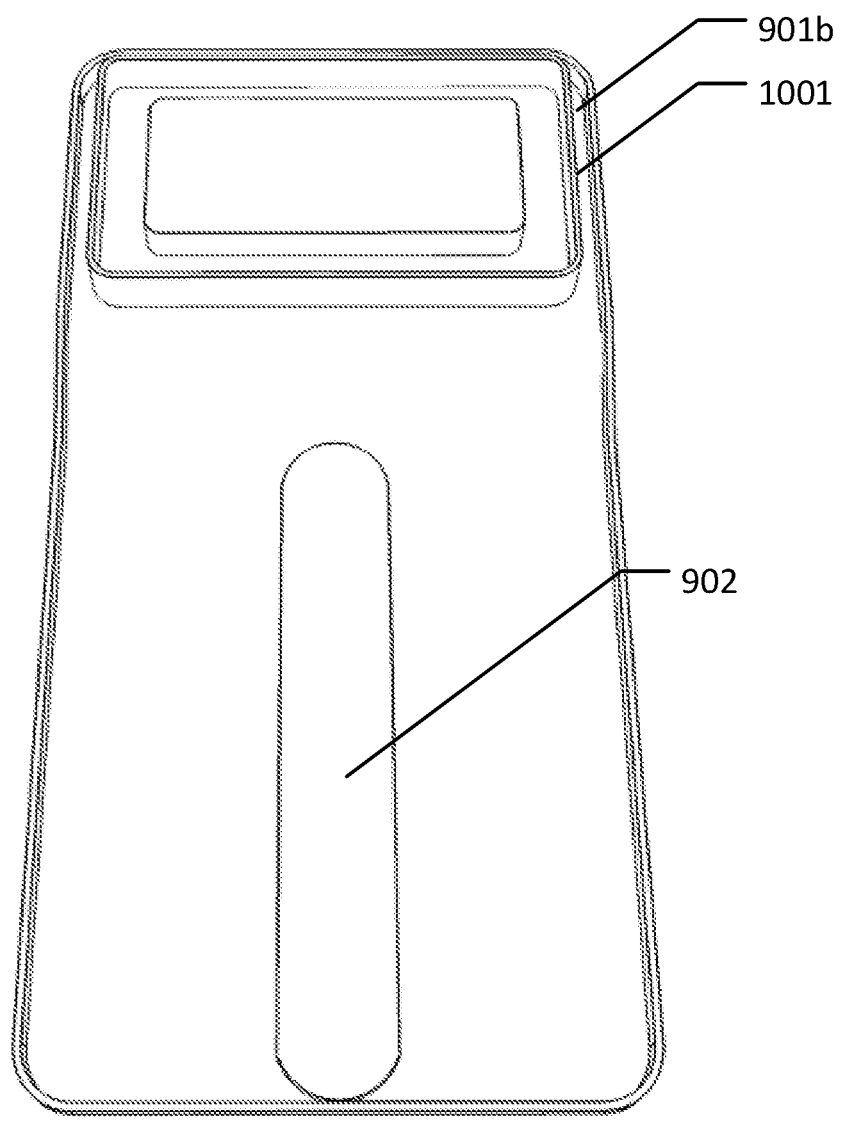
FIG. 10A illustrates a back view of a bottom rigid support comprising a tray.

FIG. 10A illustrates a back view of bottom rigid support 901b comprising a tray 1001. Tray 1001 can be attached under the top back surface of each rigid support 901, such that tray 1001 can be positioned behind slits 903. Tray 1001 can be made of durable waterproof material that can include but is not limited to polyethylene, or plastics such as petroleum-based plastic, plastic-treated material, plant-based plastic (or bioplastic). Further, indentation 902 can protrude at the back-middle portion of bottom rigid support 901b.

Figure 10B:
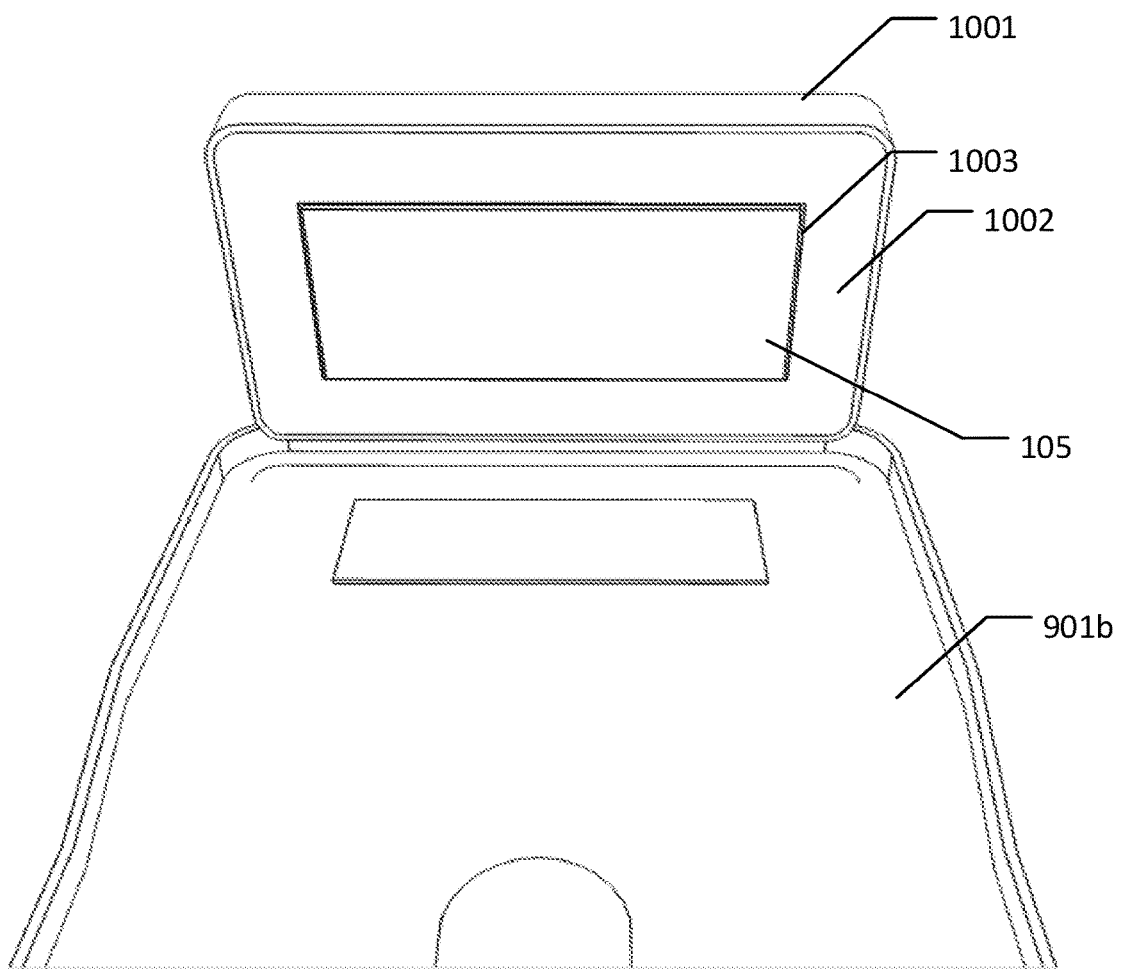
FIG. 10B illustrates a tray removed from a bottom rigid support.

FIG. 10B illustrates tray 1001 removed from back rigid support 901b. In this embodiment, tray 1001 can comprise a rim 1002 and a recess 1003. Rim 1002 can be a raised flat outer edge portion of tray 1001. Recess 1003 can be the center portion of tray 1001 that can one or more house absorbent inner cores 202. Inner layer 201 can be attached over slits 903. In another embodiment, rim 1002 can be attached at the back-top surface of rigid support 901 such that rim 1002 goes around slits 903.

Figure 10C:
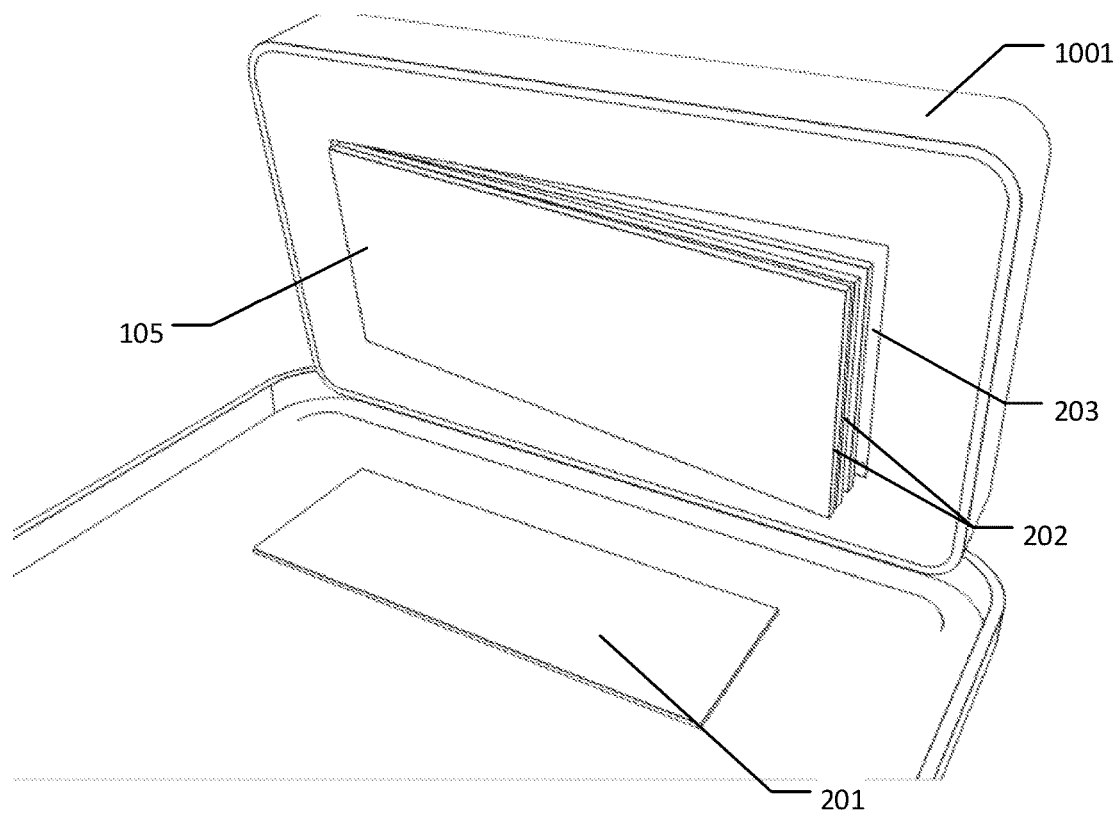
FIG. 10C illustrates a lining that can be placed within a shallow portion.

FIG. 10C illustrates absorbent inner core 202 within recess 1003. In this embodiment, one or more absorbent inner cores 202 can be stacked inside recess 1003. As such, the bottom portion of tray 1001 can serve as waterproof outer layer 203. In such embodiment, tray 1001 can be made of an impermeable material. Inner layer 201 can be the top most layer placed under slits 903, absorbent inner cores 202 can be placed under inner layer 201, while the bottom surface of recess 1003 can serve as waterproof outer layer 203 that can prevent liquid from leaking out of tray 1001. In such embodiment, inner layer 201 can be attached directly to rigid support 901b or tray 1001. Absorbent inner cores 202 can comprise a super absorbent polymer or any other absorbent material described above. Absorbent inner core 202 can draw moisture away from the razor, preserving the integrity of the blades, extending the life of the razor.

Figure 11:
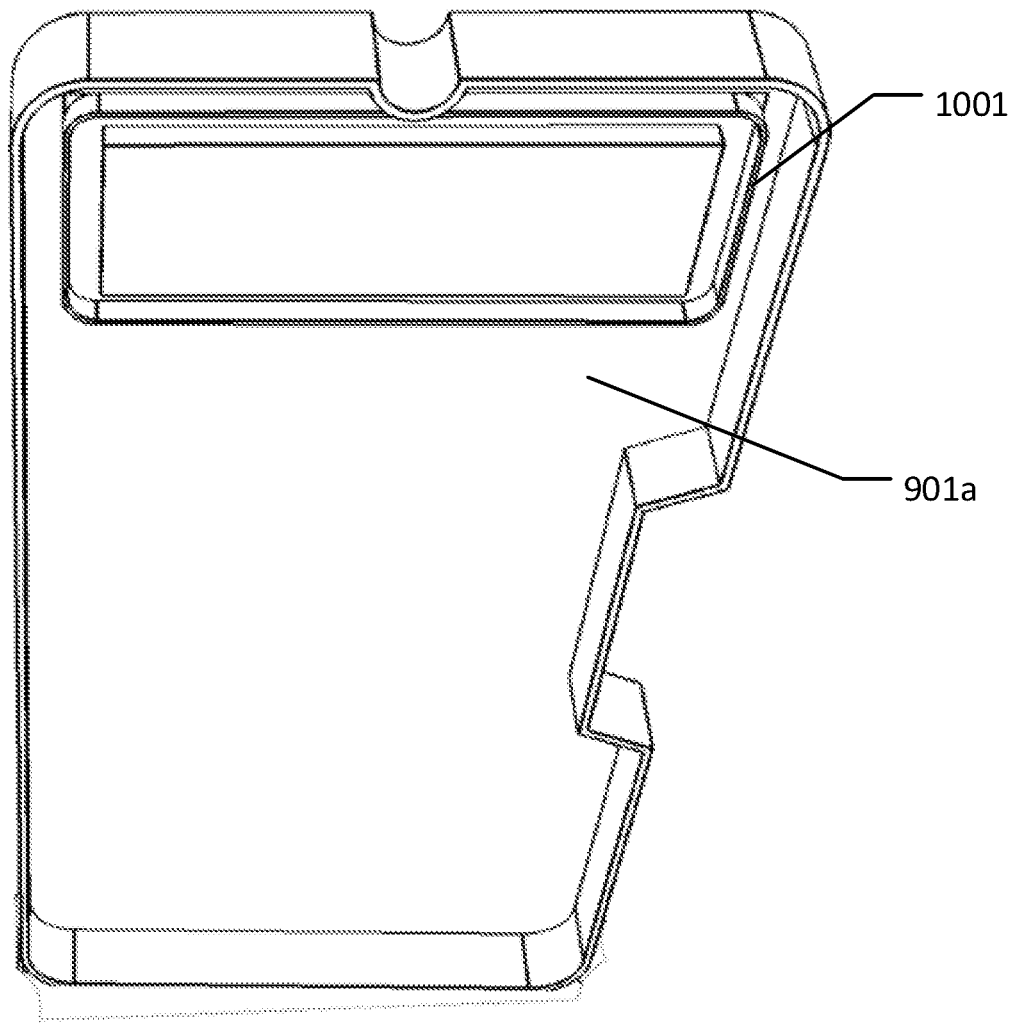
FIG. 11 illustrates a back view of a top rigid support comprising a tray.

FIG. 11 illustrates a back view of front rigid support 901a comprising tray 1001. Such tray can be similarly configured with absorbent inner cores 202 and inner layer 201.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A razor enclosure comprising
   a casing comprising a base and a lid, said casing capable of housing a razor, said lid capable of forming a substantially enclosed chamber with said base;
   a bottom rigid support, said bottom rigid support mounted within said base, said bottom rigid support comprising
      a first set of one or more slits at a top front surface of said bottom rigid support;
      a tray comprising a rim and a recess, said rim attached at a top back surface of said bottom rigid support such that said recess is between said first set of one or more slits and said base; and
      a permeable inner layer mounted over said first set of one or more slits, and
      a first set of one or more absorbent inner cores placed within said recess; and
   a top rigid support, said top rigid support mounted within said lid, further said top rigid support comprising
      a second set of one or more slits at a top front surface of said top rigid support;
      a second tray comprising a second rim and a second recess, said second rim attached at a top back surface of said top rigid support such that said second recess is between said second set of one or more slits and said lid; and
      a second permeable inner layer mounted over said second set of one more slits, and
      a second set of one or more absorbent inner cores placed within said second recess.

2. The razor enclosure of claim 1 wherein said casing and said bottom rigid support are unibody.

3. The razor enclosure of claim 1 wherein said bottom rigid support is removable from said casing.

4. The razor enclosure of claim 1 wherein each of said bottom rigid support is replaceable with a new bottom rigid support.

5. The razor enclosure of claim 1 wherein a middle portion of said bottom rigid support further comprises an indention, said indention capable of keeping a handle of a razor at a fixed position such that the head of the razor is positioned proximate said first set of one or more slits.

6. The razor enclosure of claim 1 wherein said permeable inner layer is permanently attached between said first set of one or more slits and said tray.

7. The razor enclosure of claim 1 wherein said tray comprises a material impermeable to water.

8. The razor enclosure of claim 1 wherein said first set of one or more absorbent inner cores comprises a super absorbent polymer.

* * * * *